United States Patent [19]
Hall et al.

[11] Patent Number: 5,357,965
[45] Date of Patent: Oct. 25, 1994

[54] METHOD FOR CONTROLLING ADAPTIVE COLOR FLOW PROCESSING USING FUZZY LOGIC

[75] Inventors: Anne L. Hall, New Berlin; Michael J. Harsh, Waukesha, both of Wis.

[73] Assignee: General Electric Company, Milwaukee, Wis.

[21] Appl. No.: 158,071

[22] Filed: Nov. 24, 1993

[51] Int. Cl.$^5$ .............................................. A61B 8/00
[52] U.S. Cl. ........................... 128/661.08; 364/413.25
[58] Field of Search ................. 128/4, 661.01, 661.08, 128/661.09, 661.10, 719, 731; 364/413.25

[56] References Cited

U.S. PATENT DOCUMENTS

| | | | |
|---|---|---|---|
| 5,269,289 | 12/1993 | Takehana et al. | 128/4 |
| 5,307,807 | 5/1994 | Sosa et al. | 128/731 |
| 5,309,921 | 5/1994 | Kisner et al. | 128/719 |

OTHER PUBLICATIONS

Kasai, Chihiro et al., "Real-Time Two-Dimensional Blood Flow Imaging Using an Autocorrelation Technique", IEEE Transactions On Sonics and Ultrasonics, vol. SU-32, No. 3., May 1985, pp. 458–464.

*Primary Examiner*—George Manuel
*Attorney, Agent, or Firm*—Dennis M. Flaherty; John H. Pilarski

[57] ABSTRACT

A color flow processor has a fuzzy logic processor for determining when an adaptive wall filter can be turned off in response to the condition wherein flow signal will be treated as wall signal. The fuzzy logic processor uses details of wall velocity and power, as well as variance, to determine whether the measured echo signal component to be filtered truly represents the wall velocity only. The general rule applied by the fuzzy logic processor would be that if the wall velocity is LOW and the wall variance is LOW and the wall power is HIGH, than the adaptive filter is turned ON, where LOW and HIGH are fuzzy values. Use can be made of information from previous states, either temporally or spatially, allowing the system to adapt itself to each study or over time.

17 Claims, 6 Drawing Sheets

METHOD FOR CONTROLLING ADAPTIVE COLOR FLOW PROCESSING USING FUZZY LOGIC

FIELD OF THE INVENTION

This invention generally relates to ultrasound color flow Doppler imaging of fluid flow fields. In particular, the invention relates to a method and an apparatus for imaging blood flowing in the human body by detecting Doppler shifting of ultrasonic echoes reflected from the flowing blood.

BACKGROUND OF THE INVENTION

Measurement of blood flow in the heart and vessels using the Doppler effect is well known. Whereas the amplitude of the reflected waves is employed to produce black and white images of the tissues, the frequency shift of the reflected waves may be used to measure the velocity of reflecting scatterers from tissue or blood. Color flow images are produced by superimposing a color image of the velocity of moving material, such as blood, over the black and white anatomical image. The measured velocity of flow at each pixel determines its color.

A major difficulty in making Doppler effect measurements of reflected ultrasonic waves from blood is that the received echo signal typically contains a large component produced by stationary or slowly moving tissues, whereas blood reflects ultrasound very weakly. The stationary tissues do not produce any frequency shift in the reflected waves and these components can easily be filtered out without affecting the flow measurement. However, the reflections produced by the moving tissue due to cardiac or respiratory motion are frequency shifted and may completely overwhelm signals from slowly flowing blood.

In standard color flow processing, a high pass filter known as a wall filter is applied to the data before a color flow estimate is made. The purpose of this filter is to remove signal components produced by tissue surrounding the blood flow of interest. If these signal components are not removed, the resulting velocity estimate will be a combination of the velocities from the blood flow and the surrounding tissue. The backscatter component from tissue is many times larger than that from blood, so the velocity estimate will most likely be more representative of the tissue, rather than the blood flow. In order to get the flow velocity, the tissue signal must be filtered out.

Most commonly, color flow processors assume that the large signal returning from the surrounding tissue is static, that is the tissue is not moving. If this is the case, the quadrature I and Q data can be filtered separately with simple real filters which remove the DC component. The cutoff frequency of these high pass filters can be varied for a given application by changing the filter coefficients.

The assumption of static tissue is generally a good one for radiology applications, except in the abdomen, where residual respiratory and cardiac motion cause some amount of tissue motion. In addition, the motion of the handheld transducer will also look like tissue motion. Since the velocity of this motion is usually slow compared to the velocity of the blood flow being imaged, the operator can set the wall filter cutoff frequency high enough to filter out the tissue signal component. Filtering in this way, however, will also remove signals from low-velocity blood flow, which are often the signals that the operator wants to image.

Two methods to solve this problem have already been proposed. In both of these methods, the velocity of the moving tissue is measured and then the non-DC wall signal is intelligently filtered out. In the first method, a spectral estimate is made using the unfiltered data, and the appropriate spectral components are "excised" prior to the flow mean frequency estimate. In the second method, the mean wall velocity is calculated from the unfiltered data, the complex I, Q data for each firing adjusted such that the resulting wall signal appears to be centered at DC, and then simple DC wall filters are used. A third approach is to filter the quadrature I, Q data as a complex signal with a complex filter, which will allow using appropriate filters whose stop bands are not centered around DC. In this case, the filter coefficients would be dynamically adapted using the measured wall velocity estimate.

All of the foregoing methods require that the wall velocity can be estimated accurately, which is true if the vessels being imaged are relatively small such that there is a very large tissue to blood backscatter ratio in the range cell. For a large vessel however, range cells inside the vessel will have flow signals that are equal to or larger than the wall component, and the unfiltered data will not accurately represent the wall velocity. If these cases are processed adaptively, a portion or all of the flow signal will be treated as a wall signal and filtered out. For this reason, these cases must be identified and the adaptive processing turned off.

SUMMARY OF THE INVENTION

The present invention is a color flow processor having an adaptive wall filter which can be turned off in response to the condition wherein flow signal will be treated as wall signal. The invention employs fuzzy logic processing to control the adaptive color flow mode in the color flow processor.

The decision whether the echo signal is primarily due to the wall could be based on the wall variance, which is usually narrow. For each range cell, a threshold could be applied that would determine whether the adaptive processing would be turned on or off. This deterministic method, however, is not optimal, since the threshold may need to vary as a function of the type of motion (hand motion versus cardiac motion), the application and even the individual being examined.

A better method is to use a fuzzy logic processor, which allows a probabilistic determination of the situation. Fuzzy logic processors are often very useful when applied to not particularly well-defined or time-variant problems such as this. The use of a fuzzy logic processor allows more data to be used in the decision-making. In accordance with the present invention, a fuzzy logic processor uses details of wall velocity and power, as well as variance, to determine whether the measured echo signal component to be filtered truly represents the wall velocity only. The general rule applied by the fuzzy logic processor would be that if the wall velocity is LOW and the wall variance is LOW and the wall power is HIGH, than the adaptive filter is turned ON, where LOW and HIGH are fuzzy values. Use can be made of information from previous states, either temporally or spatially, allowing the system to adapt itself to each study or over time.

Thus, the novel approach of the present invention utilizes a fuzzy logic processor to determine whether to apply a simple or adaptive wall filter in color flow velocity estimation.

DETAILED DESCRIPTION OF THE PREFERRED EMBODIMENTS

Figure 1:
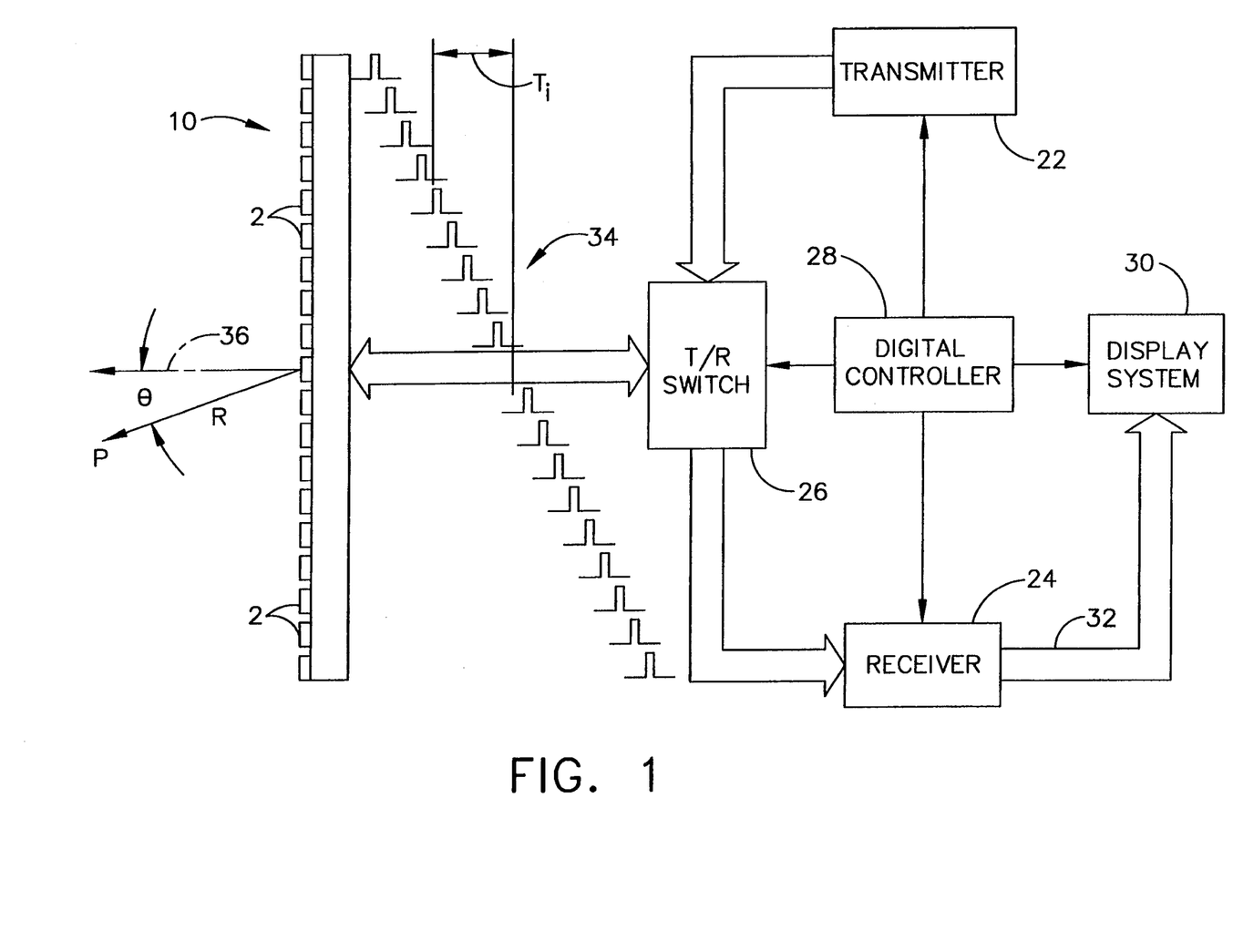
FIG. 1 is a block diagram of an ultrasonic imaging system which incorporates the present invention.

Referring to FIG. 1, the ultrasonic imaging system incorporating the invention includes a transducer array 10 comprised of a plurality of separately driven transducers 2, each of which produces a burst of ultrasonic energy when energized by a pulsed waveform produced by a transmitter 22. The ultrasonic energy reflected back to transducer array 10 from the object under study is converted to an electrical signal by each receiving transducer 2 and applied separately to a receiver 24 through a set of transmit/receive (T/R) switches 26. Transmitter 22, receiver 24 and switches 26 are operated under control of a digital controller 28 responsive to commands by a human operator. A complete scan is performed by acquiring a series of echoes in which switches 26 are set to their transmit position, transmitter 22 is gated ON momentarily to energize each transducer 2, switches 26 are then set to their receive position, and the subsequent echo signals produced by each transducer 2 are applied to receiver 24. The separate echo signals from each transducer 2 are combined in receiver 24 to produce a single echo signal which is used to produce a line in an image on a display system 30.

Transmitter 22 drives transducer array 10 such that the ultrasonic energy produced is directed, or steered, in a beam. To accomplish this, transmitter 22 imparts a time delay $T_i$ to the respective pulsed waveforms 34 that are applied to successive transducers 2. By adjusting the time delays $T_i$ appropriately in a conventional manner, the ultrasonic beam can be directed away from axis 36 by an angle $\theta$ and/or focussed at a fixed range R. A sector scan is performed by progressively changing the time delays $T_i$ in successive excitations. The angle $\theta$ is thus changed in increments to steer the transmitted beam in a succession of directions.

The echo signals produced by each burst of ultrasonic energy reflect from objects located at successive ranges along the ultrasonic beam. The echo signals are sensed separately by each transducer 2 and a sample of the magnitude of the echo signal at a particular point in time represents the amount of reflection occurring at a specific range. Due to the differences in the propagation paths between a reflecting point P and each transducer 2, however, these echo signals will not be detected simultaneously and their amplitudes will not be equal. Receiver 24 amplifies the separate echo signals, imparts the proper time delay to each, and sums them to provide a single echo signal which accurately indicates the total ultrasonic energy reflected from point P located at range R along the ultrasonic beam oriented at the angle $\theta$. Demodulation can occur either before or after the individual received signals are summed together.

Figure 2:
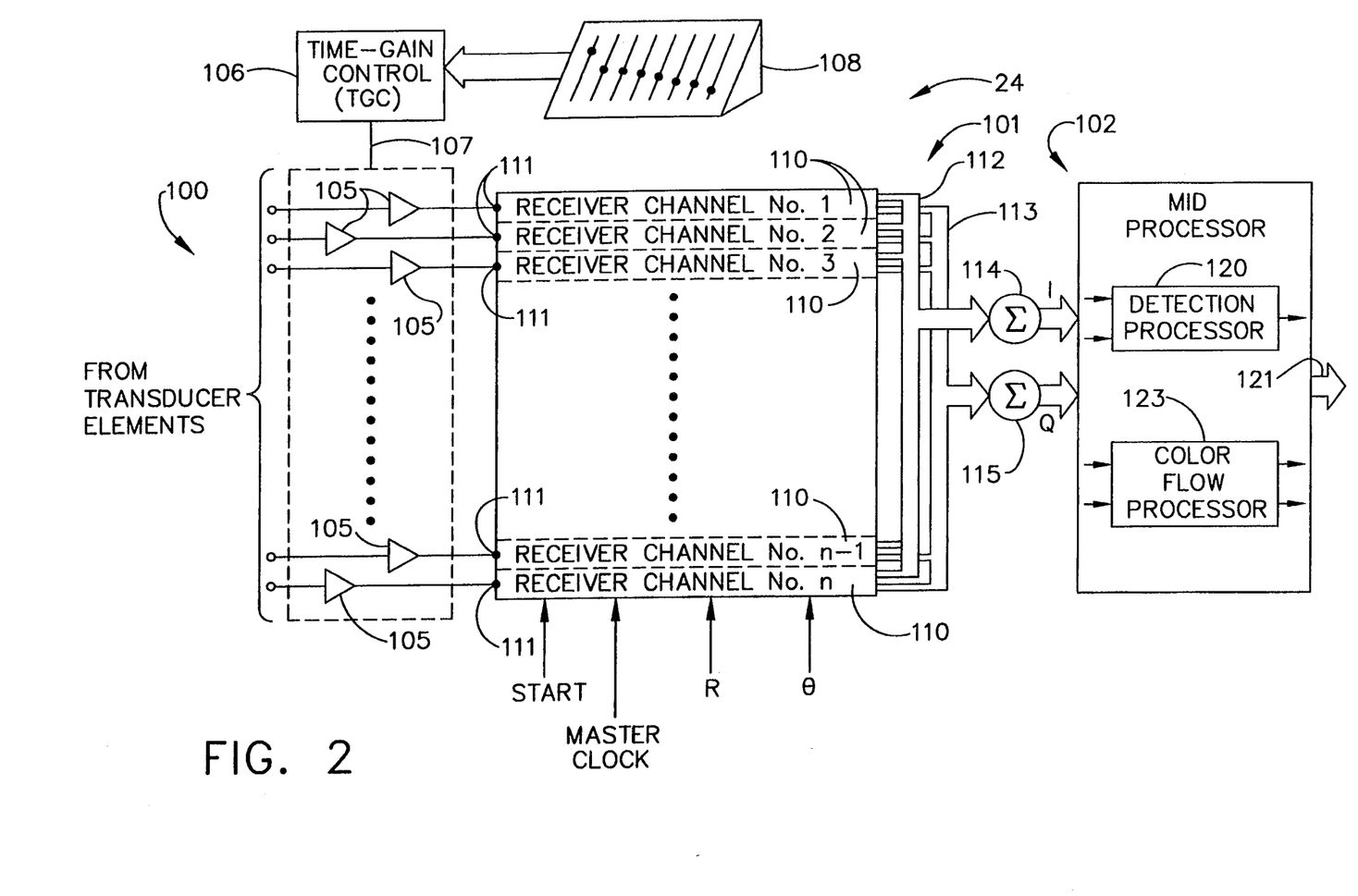
FIG. 2 is a block diagram of a receiver which forms part of the system of FIG. 1.

To simultaneously sum the electrical signals produced by the echoes impinging on each transducer 2, time delays are introduced into each separate transducer channel 110 of receiver 24 (see FIG. 2). The beam time delays for reception are the same delays ($T_i$) as the transmission delays described above. However, the time delay of each receiver channel is continuously changing during reception of the echo to provide dynamic focussing of the received beam at the range R from which the echo signal emanates.

Under direction of digital controller 28, receiver 24 provides delays during the scan such that steering of receiver 24 tracks the direction $\theta$ of the beam steered by transmitter 22 and samples the echo signals at a succession of ranges R and provides the proper delays and phase shifts to dynamically focus at points P along the beam. Thus, each emission of an ultrasonic pulse waveform results in the acquisition of a series of data points which represent the amount of reflected sound from a corresponding series of points P located along the ultrasonic beam.

Display system 30 receives the series of data points produced by receiver 24 and converts the data into the desired image.

Referring to FIG. 2, receiver 24 comprises three sections: a time-gain control section 100, a receive beamforming section 101 and a mid-processor 102. Time-gain control (TGC) section 100 includes a respective amplifier 105 for each of the receiver channels 110 and a time-gain control circuit 106. The input of each amplifier 105 is connected to a respective one of transducers 2 to amplify the echo signal which it receives. The amount of amplification provided by amplifiers 105 is controlled through a control line 107 that is driven by TGC circuit 106, the latter being set by hand operation of potentiometers 108.

The receive beamforming section 101 of receiver 24 includes separate receiver channels 110. Each receiver channel 110 receives the analog echo signal from one of amplifiers 105 at an input 111. Each amplified signals is conveyed to a pair of quadrature detectors in the respective receiver channel, where the phases of the mixing reference frequency differ by 90°. Since this reference frequency is made identical to that of the transmitted pulses, the outputs from low-pass filter in the receiver channel become the complex Doppler frequencies that have been shifted by Doppler effects, and the pair of outputs also become complex signals (I and Q) with phases that differ by 90°. These signals are output as a stream of digitized output values on an I bus 112 and a Q bus 113. Each of these I and Q baseband signals represents a demodulated sample of the echo signal envelope at a specific range R. These samples have been delayed such that when they are summed at summing points 114 and 115 with the I and Q samples from each of the other receiver channels 110, the summed signals indicate the magnitude and phase of the echo signal reflected from a point P located at range R on the steered beam ($\theta$). Alternatively, the demodulation can be performed after the individual received signals are summed.

Midprocessor section 102 receives the beam samples from summing points 114 and 115. The I and Q values of each beam sample are signals representing the in-phase and quadrature components of the magnitude of the reflected sound from a point (R, $\theta$). A color flow processor 123 receives the I and Q values of each demodulated and focussed echo signal sample from summing points 114 and 115, and produces a flow value at the midprocessor output 121. This flow signal controls the red, green and blue display colors, and is applied to display system 30 (see FIG. 1) along with the magnitude M for the same point. The color indicated by this flow value is a function of the velocity and direction of flow, and possibly the flow variance or power, as measured by color flow processor 123.

Figure 3:
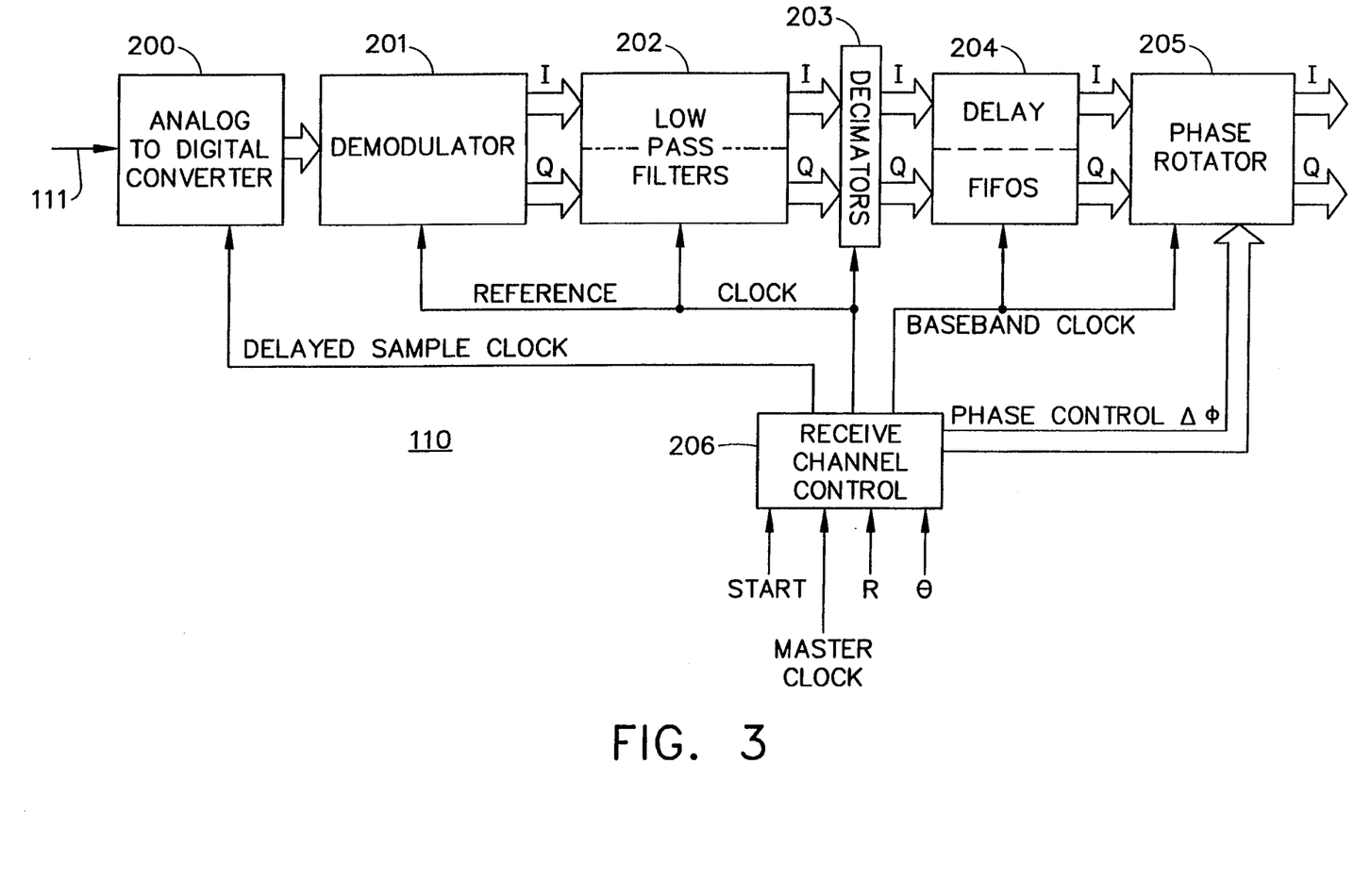
FIG. 3 is a block diagram of a receiver channel which forms part of the receiver of FIG. 2.

Referring to FIG. 3, each receiver channel is responsive to a START command, a master clock, and a beam angle signal ($\theta$) from digital controller 28 (FIG. 1) to perform the digital beamforming functions, which include: sampling the analog input signal 111 in an analog-to-digital converter (ADC) 200; demodulating the sampled signal in a demodulator 201; filtering out the high-frequency sum signals produced by demodulator 201 with low pass filters 202; reducing the data rate in decimators 203; time delaying and, if necessary, phase shifting, the resulting digital data stream in delay FIFOs (i.e., first-in/first-out memories) 204 and phase rotator 205. Elements 200–205 are controlled by a receive channel control 206 which produces the required clock and control signals in response to commands from digital controller 28 (FIG. 1).

The ADC 200 samples the analog signal at regular intervals. These samples are provided to demodulator 201, which mixes each sample with both a reference that is in-phase with the transmitted ultrasonic carrier, and with a reference in quadrature with the transmitted ultrasonic carrier. The low pass filters 202 are finite impulse response (FIR) filters tuned to pass the difference frequencies, but block the higher sum frequencies supplied by demodulator 201. The output signal of each low pass filter is a stream of digital values which indicate the magnitude of the I or Q component of the echo signal envelope.

The rate at which the demodulated I and Q components of the echo signal are sampled is reduced by decimators 203. The echo signal envelope represented by the demodulated and decimated digital samples is then delayed by delay FIFOs 204 and possibly phase shifted by phase rotator 205 to provide the desired beam steering and beam focusing.

The color flow midprocessor 123 is used to provide a real-time two-dimensional image of blood velocity in the imaging plane. The blood velocity is calculated by measuring the phase shift from firing to firing at a specific range gate. Instead of measuring the Doppler spectrum at one range gate in the image, mean blood velocity from multiple vector positions and multiple range gates along each vector are calculated, and a two-dimensional image is made from this information.

Figure 4:
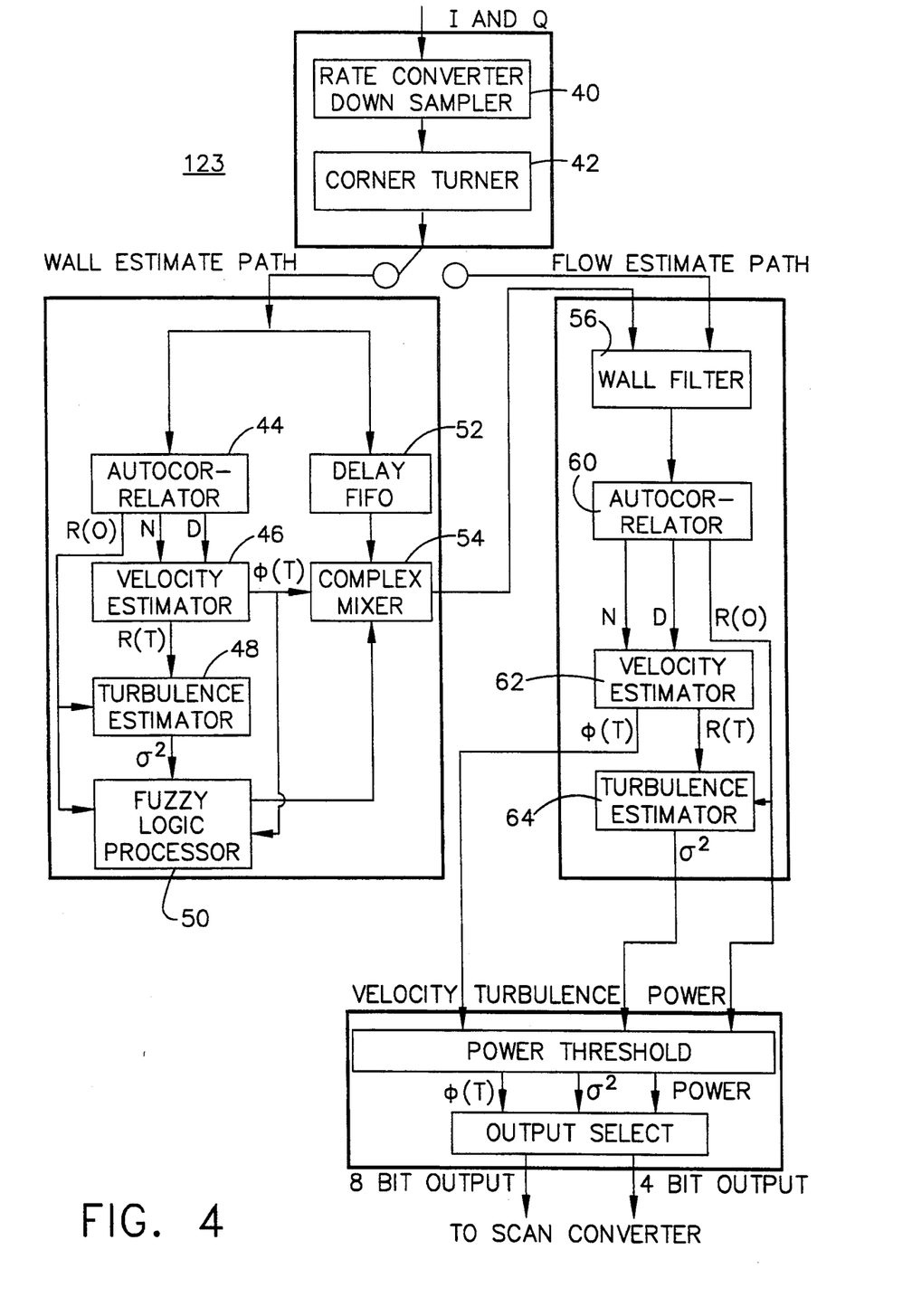
FIG. 4 is a schematic diagram of a color flow processor in accordance with the present invention, which forms part of the receiver of FIG. 2.

The color flow midprocessor 123 receives the summed complex I/Q data from the beamformer and processes it to calculate flow velocity, turbulence, and power for all sample volumes within an operator-defined region. Referring to FIG. 4, the incoming data is rate converted and down-sampled (40) such that the resulting number of data points is consistent with the output display resolution. The downsampled data is stored in a corner turner 42, whose purpose is to buffer data from possibly interleaved firings and output the data as vectors of points across firings at a given range cell.

The color flow processor has an adaptive mode and a nonadaptive mode. The adaptive mode is used to suppress tissue motion, and uses both the wall estimate path and the flow estimate path. The nonadaptive mode uses only the flow estimate path. The adaptive mode provides an estimate of the wall velocity and variance, which allows the system to adaptively vary the wall filter to match the characteristics of the wall signal. The wall estimate path includes autocorrelator 44, velocity estimator 46 and turbulence (variance) estimator 48; the flow estimate path similarly includes autocorrelator 60, velocity estimator 62 and turbulence (variance) estimator 64.

In the adaptive mode the wall velocity, power and variance (turbulence) are calculated at every range cell. In accordance with the present invention, the wall velocity, power and variance are processed by a fuzzy logic processor 50, which determines whether the wall velocity should be mixed in complex mixer 54 with the I and Q input data held in delay FIFO 52. If the fuzzy logic processor determines that the nonadaptive mode should be used, a zero wall velocity will be mixed with the I and Q input data. If the fuzzy logic processor determines that the adaptive mode should be used, the wall velocity output by velocity estimator 46 will be mixed with the I and Q input data.

In the adaptive mode, the mean value output signal $\phi(T)$ from the wall velocity estimator 46 is applied to the reference input of complex mixer 54. At the same time, the delayed I and Q values of the same demodulated echo signal sample used to produce signal $\phi(T)$ are applied to the inputs of complex mixer 54. Frequency-shifted output signals I' and Q' are produced by complex mixer 54 according to the following equations:

$$I' = I \cos \phi(T) + Q \sin \phi(T) \quad (1)$$

$$Q' = I \sin \phi(T) - Q \cos \phi(T) \quad (2)$$

The effect of this complex mixing with the mean Doppler frequency shift $\phi(T)$ is to shift all the demodulated echo signal frequencies by the value $-\phi(T)$. Since in most situations the filter wall signal components dominate the echo signal, the shift in frequency by complex mixer 54 in essence shifts the mean value of the wall signal frequency to zero or DC.

Figure 5A:
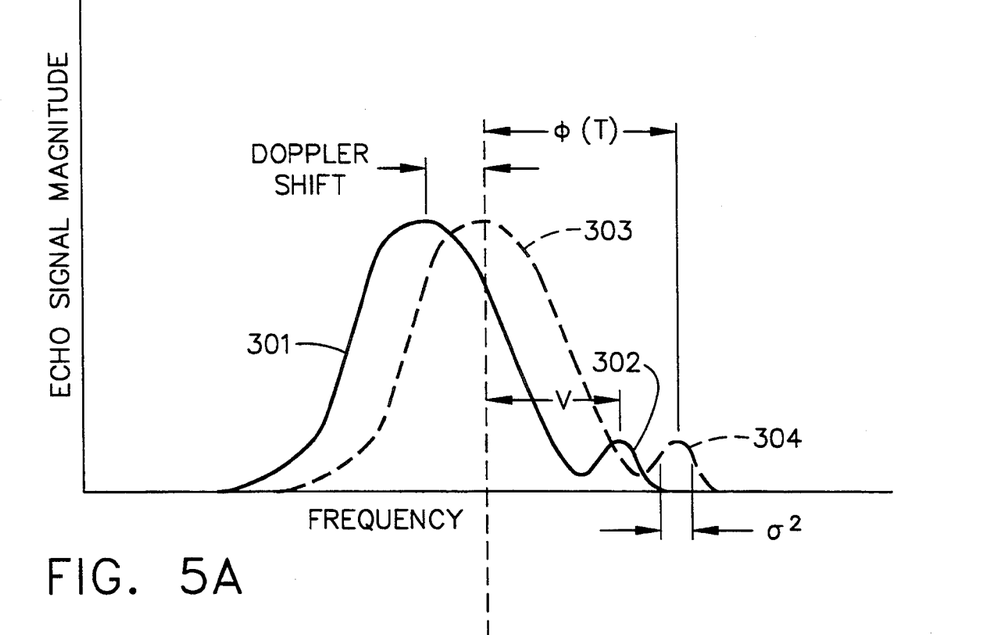
FIG. 5A is a graphic illustration of the echo signal magnitude versus frequency.

As shown in FIG. 5A, for example, the echo signal may include a wall signal component 301 shifted in frequency in one direction from the carrier due to the Doppler effect. The echo signal also includes a much smaller flow signal component 302 which has been frequency shifted by the Doppler effect in the other direction. The measured mean frequency $\phi(T)$ of the total signal is essentially that of the much larger wall signal component 301, and the resulting shifted echo signal at the output of complex mixer 54 is indicated by the dashed lines 303 and 304. The large wall signal component has thus been shifted in frequency and is now substantially centered about D.C.

Figure 5B:
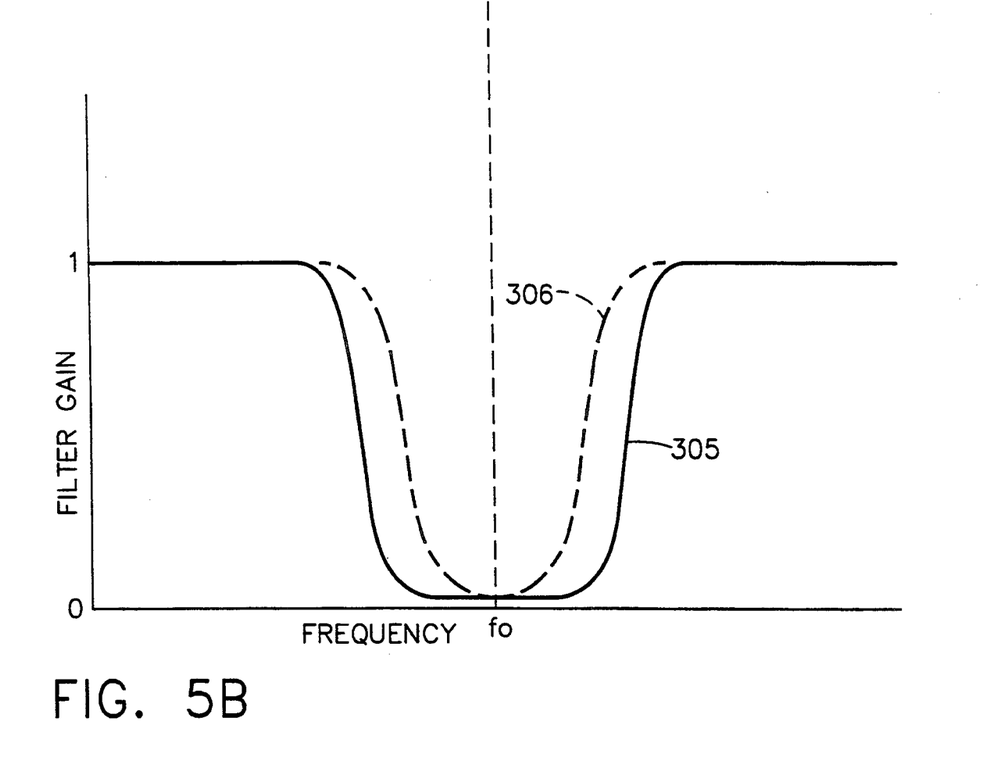
FIG. 5B is a graphic illustration of the adaptive wall filter characteristic.

Referring again to FIG. 4, the I and Q values for the shifted echo signal are applied to the inputs of a highpass FIR wall filter 56, which has a stop band centered at DC and has a filter characteristic 305 shown in FIG. 5B. The width of this stop band is determined by filter coefficients which are supplied by a filter coefficient look-up table (LUT) (not shown). For example, another set of applied filter coefficients may produce a filter characteristic 306 as shown in FIG. 5B, with a narrower stop band than that of filter characteristic 311. This feature facilitates control of the width of the FIR filter stop band such that it matches the bandwidth of the centered wall signal component.

The autocorrelator (44 or 60) and velocity estimator (46 or 62) has two additional outputs R(0) and R(T) from which the variance of the unfiltered baseband echo signal can be calculated. This calculation is performed by the turbulence estimator (48 or 64) in accordance with the following equation:

$$\sigma^2 = (1 - |R(T)|/R(0))/T^2 \qquad (3)$$

where $R(\tau)$ is the autocorrelation function; and T is the emission interval of ultrasonic pulses. As shown in FIG. 5A, this variance $\sigma^2$ is an indication of the width of the wall signal components. The variance $\sigma^2$ can be used to select wall filter coefficients from a look-up table (not shown) which match the stop band of wall filter 56 to the bandwidth of the applied echo signal. As a result, the output signal of wall filter 56 is a filtered echo signal primarily comprising the flow signal components 304 shown in FIG. 5A.

The filtered echo signal components (I' and Q') produced by wall filter 56 are supplied to autocorrelator 60 via normalizer 58. Flow velocity estimator 62 produces a mean value signal $\phi(T)$ which is an estimate of the mean Doppler frequency shift of the flowing reflectors, which in turn is proportional to the mean blood flow velocity.

The autocorrelation/velocity estimator circuits 44/46 and 60/62 may be constructed, for example, from a complex conjugate multiplier, a pair of delays and a pair of integrators as disclosed by Kasai et al. in an article in IEEE Trans. Sonics & Ultrasonics, Vol. SU-32, No. 3, May 1985, pp. 458–464, entitled 'Real-Time Two-Dimensional Blood Flow Imaging Using Autocorrelation Technique', which is incorporated herein by reference.

The output signal $\phi(T)$ forms the flow velocity component of the flow signal produced by color flow processor 123 and is applied to the least significant digit address inputs on a chrominance control LUT which resides in the display system 30 (FIG. 1). Each addressable memory in the chrominance control LUT stores 24 bits of data which are read out on a bus. For each pixel in the image to be produced, eight of these bits control the intensity of red, eight bits indicate the intensity of green, and eight bits control the intensity of blue. These bit patterns are preselected such that as the flow velocity changes in direction or magnitude, the color of the pixel at the location (R, $\theta$) is changed. For example, flow toward the transducer may be indicated as red and flow away from the transducer may be indicated as blue. The faster the flow, the brighter the color.

To indicate the nature of the flowing reflectors, a turbulence estimator 64 computes the variance using the R(0) output from autocorrelator 60 and the R(T) output from velocity estimator 62. Turbulence estimator 64 is identical to turbulence estimator 48 described above and produces an output signal $\sigma^2$ which indicates the frequency spread of the flow signal component of the baseband echo signal. This value is indicative of flow turbulence, since laminar flow has a very narrow range of velocities, while turbulent flow is a mixture of many velocities. The turbulence value $\sigma^2$ is supplied from color flow processor 123 as another component of the flow signal on bus 121, and it is applied to the most significant digit address terminals on the chrominance control LUT. The 4-bit turbulence value $\sigma^2$ completes the address from which chrominance control data will be read out of the chrominance control LUT.

In accordance with the present invention, fuzzy logic processor 50 determines when the adaptive mode can be turned off in response to the condition wherein flow signal will be treated as wall signal. The fuzzy logic processor uses details of wall velocity and power, as well as variance, to determine whether the measured echo signal component to be mixed in complex mixer 54 truly represents the wall velocity only. If it does represent wall velocity only, the adaptive mode is turned off by sending a "crisp" wallness output from fuzzy logic processor 50 which disables mixing of the wall velocity with the I and Q inputs. In the nonadaptive mode, it is assumed that the tissue is stationary. Therefore a simple wall filter is used to remove dc components attributable to the stationary tissue.

Figure 6A:
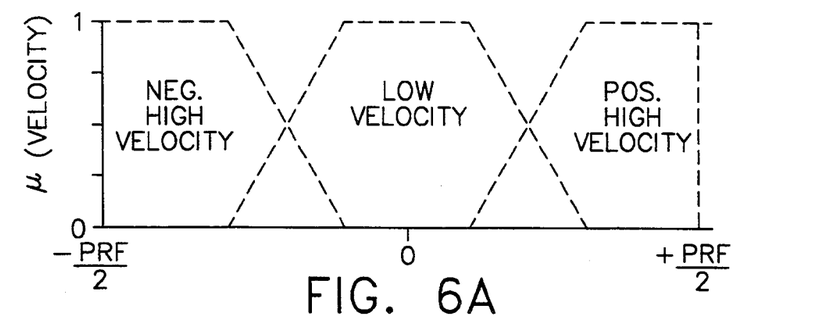
FIGS. 6A, 6B and 6C show the crisp-to-fuzzy transforms which change crisp inputs of velocity, power and variance, respectively, into fuzzy degrees of membership.
Figure 6B:
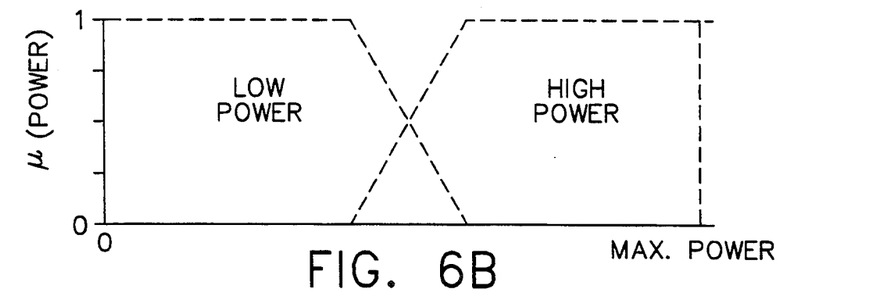
Figure 6C:
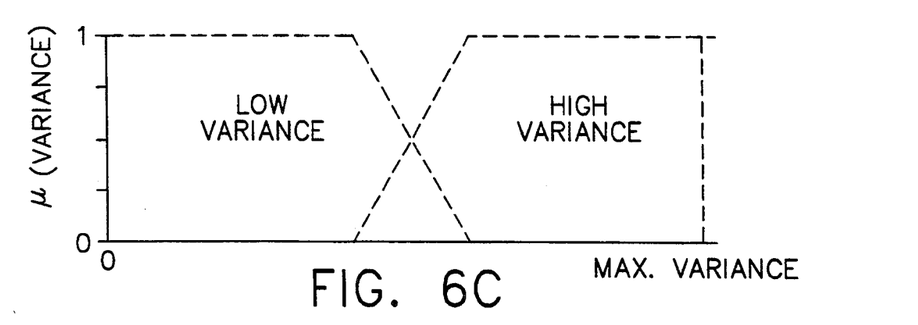

Fuzzy logic allows one to express the operational and control laws of a system in terms of words rather than numbers. To apply fuzzy set theory to color flow imaging, the degree to which the variables velocity, power and variance are members of a set must be indicated. Exemplary degree-of-membership functions for velocity, power and variance are depicted in FIGS. 6A, 6B and 6C respectively. Each of these crisp-to-fuzzy transforms is a mapping of an actual crisp value to a degree of membership. The resulting degree of membership then becomes an input to the inference mechanism.

In the inference mechanism, inputs and truth values serve as conditions for the rules that make up the rule base. At regular intervals, the fuzzy logic processor samples inputs and applies them to the rule base, resulting in appropriate system outputs. The general form of each rule is:

If INPUT is VALUE1, then ACTION is VALUE2, where VALUE1 and VALUE2 refer to the respective specific fuzzy sets associated with the particular INPUT or ACTION. When the rule "fires", the action occurs, but only to the degree that the input is true.

An exemplary set of rules which could be used to control adaptive color flow imaging are as follows:

RULE 1: If VELOCITY IS NEGHIGH, then WALLNESS IS LOW.
RULE 2: If VELOCITY IS POSHIGH, then WALLNESS IS LOW.
RULE 3: If VARIANCE IS HIGH, then WALLNESS IS LOW.
RULE 4: If POWER IS LOW, then WALLNESS IS LOW.
RULE 5: If VELOCITY IS LOW and VARIANCE IS LOW and POWER IS HIGH, then WALLNESS IS HIGH.

A method of combining actions is necessary because more than one rule may fire for any given set of inputs to fuzzy logic processor 50. In addition, the resulting single action (combined from the actions of triggered rules) must be transformed from a fuzzy value to a crisp, executable value.

Figure 6D:
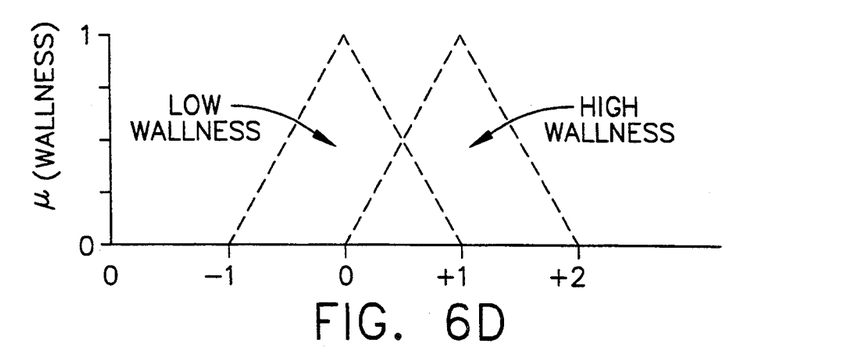
FIG. 6D shows the fuzzy-to-crisp transform which can be used to combines several fuzzy output actions to form a single executable action.

One of several popular combination/defuzzification techniques is the centroid method, which results in an output action that is associated with the center of mass of the active rule outputs. The centroid method combines several fuzzy output actions to form a single executable action. This single output is a weighted average of the centroids of each degree-of-membership function for each triggered rule. The mu values for each triggered rule, if less than unity, are used to clip the respective "high" and "low" membership function for wallness shown in FIG. 6D. If a triggered rule has more than one antecedent clause, the minimum value is used (since the fuzzy logic equivalent of the logical AND function is MIN) to clip the relevant membership function for wallness. To produce a single value from two fuzzy sets for wallness (e.g., a clipped "low" membership function for wallness and a clipped "high" membership function for wallness), the two fuzzy sets are aggregated or superimposed and the resulting center of mass is determined. This "crisp" value is then output by fuzzy logic processor 50 to complex mixer 54. If the "crisp" wallness value is greater than a predetermined threshold, the adaptive mode is used, i.e., the wall velocity estimate is mixed with the I and Q input data.

The foregoing preferred embodiments have been disclosed for the purpose of illustration. Variations and modifications will be readily apparent to those skilled in the art of fuzzy logic processing. For example, combination/defuzzification techniques other than the centroid method can be used. All such variations and modifications are intended to be encompassed by the claims set forth hereinafter.

We claim:

1. In a processor for color flow imaging of the velocity of blood flowing past adjacent tissue, comprising a wall estimate path circuit and a flow estimate path, and having a nonadaptive mode in which said wall estimate path circuit is bypassed and an adaptive mode in which the estimated wall velocity of said adjacent tissue is mixed with I and Q input data in a complex mixer in said wall estimate path circuit and then output to a wall filter in said flow estimate path circuit, the improvement wherein a fuzzy logic processor in said wall estimate path circuit for determining which of said adaptive and nonadaptive modes shall be operative.

2. The color flow processor as defined in claim 1, wherein said wall estimate path circuit further comprises an autocorrelator connected to a wall velocity estimator for outputting a value corresponding to the estimated wall velocity to said complex mixer and to said fuzzy logic processor.

3. The color flow processor as defined in claim 2, wherein said fuzzy logic processor comprises first crisp-to-fuzzy transform means for mapping actual values of estimated wall velocity to a degree of membership in at least one wall velocity fuzzy set.

4. The color flow processor as defined in claim 2, wherein said wall estimate path circuit further comprises a turbulence estimator connected to receive a value corresponding to estimated wall power from said autocorrelator, to receive a value corresponding to estimated wall variance from said wall velocity estimator, and to output a value corresponding to estimated wall variance to said fuzzy logic processor.

5. The color flow processor as defined in claim 4, wherein said fuzzy logic processor comprises first crisp-to-fuzzy transform means for mapping actual values of estimated wall velocity to a degree of membership in at least one wall velocity fuzzy set, and second crisp-to-fuzzy transform means for mapping actual values of estimated wall variance to a degree of membership in at least one wall variance fuzzy set.

6. The color flow processor as defined in claim 4, wherein said fuzzy logic processor is connected to receive said value corresponding to estimated wall power from said autocorrelator.

7. The color flow processor as defined in claim 6, wherein said fuzzy logic processor comprises first crisp-to-fuzzy transform means for mapping actual values of estimated wall velocity to a degree of membership in at least one wall velocity fuzzy set, second crisp-to-fuzzy transform means for mapping actual values of estimated wall variance to a degree of membership in at least one wall variance fuzzy set, and third crisp-to-fuzzy transform means for mapping actual values of estimated wall power to a degree of membership in at least one wall power fuzzy set.

8. The color flow processor as defined in claim 7, wherein said fuzzy logic processor further comprises fuzzy-to-crisp transform means for outputting a wallness signal which controls whether estimated wall velocity values will be mixed with said I and Q input data in said complex mixer, said wallness signal being a function of said values corresponding to estimated wall velocity, variance and power.

9. The color flow processor as defined in claim 8, wherein said fuzzy logic processor further comprises inference means for outputting said wallness signal in accordance with a set of fuzzy logic rules.

10. The color flow processor as defined in claim 9, wherein said fuzzy logic rules include the rule that if the wall velocity is LOW and the wall variance is LOW and the wall power is HIGH, than wallness is HIGH, where LOW and HIGH are fuzzy values, said adaptive mode being turned ON in response to said HIGH wallness having a degree of membership greater than a predetermined threshold.

11. A method for color flow imaging of the velocity of blood flowing past adjacent tissue, comprising the steps of:
acquiring I and Q input data;
estimating the wall velocity of said adjacent tissue from said I and Q input data;
mixing said estimated wall velocity with said I and Q input data in response to said I and Q input data forming a set of data which is a member of a predetermined class of data sets;
mixing a zero wall velocity with said I and Q input data in response to said I and Q input data forming a set of data which is not a member of said predetermined class of data sets; and
determining whether said I and Q input data is a member of said predetermined class of data sets using fuzzy logic processing.

12. The method as defined in claim 11, wherein said fuzzy logic processing comprises the step of transforming said estimated wall velocity to a degree of membership in at least one wall velocity fuzzy set.

13. The method as defined in claim 11, further comprising the step of estimating the wall variance of said adjacent tissue from said I and Q input data, wherein said fuzzy logic processing comprises the steps of transforming said estimated wall velocity to a degree of membership in at least one wall velocity fuzzy set and transforming said estimated wall variance to a degree of membership in at least one wall variance fuzzy set.

14. The method as defined in claim 11, further comprising the steps of estimating the wall variance and wall power of said adjacent tissue from said I and Q input data, wherein said fuzzy logic processing comprises the steps of transforming said estimated wall velocity to a degree of membership in at least one wall velocity fuzzy set, transforming said estimated wall variance to a degree of membership in at least one wall variance fuzzy set and transforming said estimated wall power to a degree of membership in at least one wall power fuzzy set.

15. The method as defined in claim 14, wherein said fuzzy logic processing further comprises the steps of outputting a wallness signal which controls whether estimated wall velocity will be mixed with said I and Q input data, said wallness signal being output as a function of said values corresponding to estimated wall velocity, variance and power.

16. The method as defined in claim 15, wherein said fuzzy logic processing further comprises the step of outputting said wallness signal in accordance with a set of fuzzy logic rules.

17. The method as defined in claim 16, wherein said fuzzy logic rules include the rule that if the wall velocity is LOW and the wall variance is LOW and the wall power is HIGH, than wallness is HIGH, where LOW and HIGH are fuzzy values, said adaptive mode being turned ON in response to said HIGH wallness having a degree of membership greater than a predetermined threshold.

\* \* \* \* \*